United States Patent [19]
Martin et al.

[11] Patent Number: 5,533,945
[45] Date of Patent: Jul. 9, 1996

[54] FIVE-SPEED AUTOMATIC TRANSMISSION

[75] Inventors: Berthold Martin, Shelby Township; Howard L. Benford, Bloomfield Hills, both of Mich.

[73] Assignee: Chrysler Corporation, Auburn Hills, Mich.

[21] Appl. No.: 271,313

[22] Filed: Jul. 6, 1994

[51] Int. Cl.⁶ .................................................. F16H 3/62
[52] U.S. Cl. .......................................... 475/276; 475/280
[58] Field of Search .................................... 475/275, 276, 475/279, 280, 282, 284, 286, 288, 290

[56] References Cited

U.S. PATENT DOCUMENTS

| | | | |
|---|---|---|---|
| 3,811,343 | 5/1974 | Mori et al. | 475/276 |
| 3,946,623 | 3/1976 | Murakami et al. | 475/276 |
| 3,956,946 | 5/1976 | Murakami et al. | 475/276 |
| 4,027,552 | 6/1977 | Murakami et al. | 475/276 |
| 4,038,888 | 8/1977 | Murakami et al. | 475/276 |
| 4,660,439 | 4/1987 | Hiraiwa | 475/276 |
| 4,875,391 | 10/1989 | Leising et al. | 475/280 |
| 5,069,656 | 12/1991 | Sherman | 475/280 X |
| 5,099,718 | 3/1992 | Asada et al. | 475/276 X |
| 5,167,593 | 12/1992 | Pierce | 475/276 X |
| 5,188,575 | 2/1993 | Leising et al. | 475/280 |

FOREIGN PATENT DOCUMENTS

| | | |
|---|---|---|
| 2483553 | 12/1981 | France. |
| 2-129447 | 5/1990 | Japan. |
| 2249361 | 5/1992 | United Kingdom. |

OTHER PUBLICATIONS

POWERFUL REVOLUTION: THREE NEW V-8 MODELS LAUNCH THE BMW 5-SERIES FOR 1994; BMW of North America, Inc. Press Release.

BMW 540i IN WHICH A GOOD EIGHT REPLACES A GREAT SIX IN THE OLD FIVE; By John Phillips; Sep. 1993; pp. 79–82.

Primary Examiner—Khoi Q. Ta
Attorney, Agent, or Firm—Thomas G. Pasternak

[57] ABSTRACT

A five-speed automatic transmission for a vehicle includes a transmission housing, an input member, an output member, a plurality of planetary gearsets for changing a ratio of torque between the input member and the output member, a plurality of clutch assemblies to selectively couple the input member to predetermined gears of the planetary gearsets, a plurality of brake assemblies to selectively couple predetermined gears of the planetary gearsets to the transmission housing, and a structure for allowing the output member and a planetary carrier from one of the planetary gearsets and an annulus gear from another of the planetary gearsets and a sun gear from yet another of the planetary gearsets to rotate simultaneously.

18 Claims, 3 Drawing Sheets

5 Speed Overdrive

| GEAR | | GEAR RATIO | C1 | C2 | C3 | C4 | C5 | C6 |
|---|---|---|---|---|---|---|---|---|
| 1 | R2+1 | 3.55 | X | | | | X | |
| 2 | (R2+1) − R2(R3/R3+1) | 2.55 | X | | | | | X |
| 3 | (R2+1) − R2(R1/R1+1) | 1.64 | X | | | X | | |
| 4 | 1.00 | 1.00 | X | X | | | | |
| 5 | R1/R1+1 | 0.75 | | X | | X | | |
| REV | −R1 | −3.00 | | | X | | X | |
| Spread | | 4.73 | | | | | | |
| Planetary Size | R1 | 3.00 | | | | | | |
| | R2 | 2.55 | | | | | | |
| | R3 | 1.55 | | | | | | |

5,533,945

FIVE-SPEED AUTOMATIC TRANSMISSION

BACKGROUND OF THE INVENTION

1. Field of the Invention

The present invention relates generally to automatic transmissions for vehicles and, more particularly, to a five-speed automatic transmission for an automotive vehicle.

2. Description of the Related Art

A conventional automatic transmission includes a hydrodynamic torque converter to transfer engine torque from an engine crankshaft to a rotatable input member of the transmission through fluid-flow forces. The transmission also includes frictional units, typically referred to as clutches, which couple the rotatable input member to one or more members of a planetary gearset. Other frictional units, typically referred to as brakes, hold one or more members of the planetary gearset stationary during the flow of power. Such transmissions also typically provide for one or more planetary gearsets in order to provide various ratios of torque and to ensure that the available torque and the respective tractive power demand are matched to each other.

An example of an automatic transmission having a plurality of planetary gearsets is a ZF five-speed automatic transmission (5 HP 30) commercially available from Zahnradfabrik Friedrichshafen AG of Germany and found on the 1994 BMW 540i vehicles. The ZF five-speed automatic transmission includes a torque converter with a lock-up clutch, three drive clutch assemblies, three brake assemblies, and three planetary gearsets.

One disadvantage of the above ZF five-speed automatic transmission is that the arrangement of the planetary gearsets provides higher losses of efficiency in fifth gear because all three gearsets are loaded. Another disadvantage of the ZF five-speed automatic transmission is that it is more difficult with good planetary gearset design to provide a 0.75 overdrive ratio and good ratio spacing.

SUMMARY OF THE INVENTION

It is, therefore, one object of the present invention to provide a five-speed automatic transmission for an automotive vehicle.

It is another object of the present invention to provide a five-speed automatic transmission that has a plurality of planetary gearsets arranged to provide all ratio steps of small to medium magnitude.

It is yet another object of the present invention to provide a five-speed automatic transmission that has a plurality of planetary gearsets arranged to provide a 0.75 overdrive ratio.

It is still another object of the present invention to provide a five-speed automatic transmission that minimizes losses of efficiency in fifth gear.

To achieve the foregoing objects, the present invention is a five-speed automatic transmission for a vehicle including a transmission housing, an input member, an output member, a plurality of planetary gearsets for changing a ratio of torque between the input member and the output member, a plurality of clutch assemblies to selectively couple the input member to predetermined gears of the planetary gearsets, a plurality of brake assemblies to selectively couple predetermined gears of the planetary gearsets to the transmission housing, and means for allowing the output member and a planetary carrier from one of the planetary gearsets, an annulus gear from another of the planetary gearsets and a sun gear from another of the planetary gearsets to rotate simultaneously.

One advantage of the present invention is that a five-speed automatic transmission is provided for an automotive vehicle. Still another advantage of the present invention is that the five-speed automatic transmission has a plurality of planetary gearsets arranged to provide good ratio spacing of small to medium magnitude, especially between first and second gears. A further advantage of the present invention is that the five-speed automatic transmission provides a unique arrangement of planetary gearsets to achieve a 0.75 overdrive ratio in fifth gear. Still a further advantage of the present invention is that the five-speed automatic transmission minimizes losses of efficiency in fifth gear by loading only one planetary gearset.

Other objects, features and advantages of the present invention will be readily appreciated as the same becomes better understood after reading the subsequent description taken in conjunction with accompanying drawings.

DESCRIPTION OF THE PREFERRED EMBODIMENT(S)

Figure 1A:
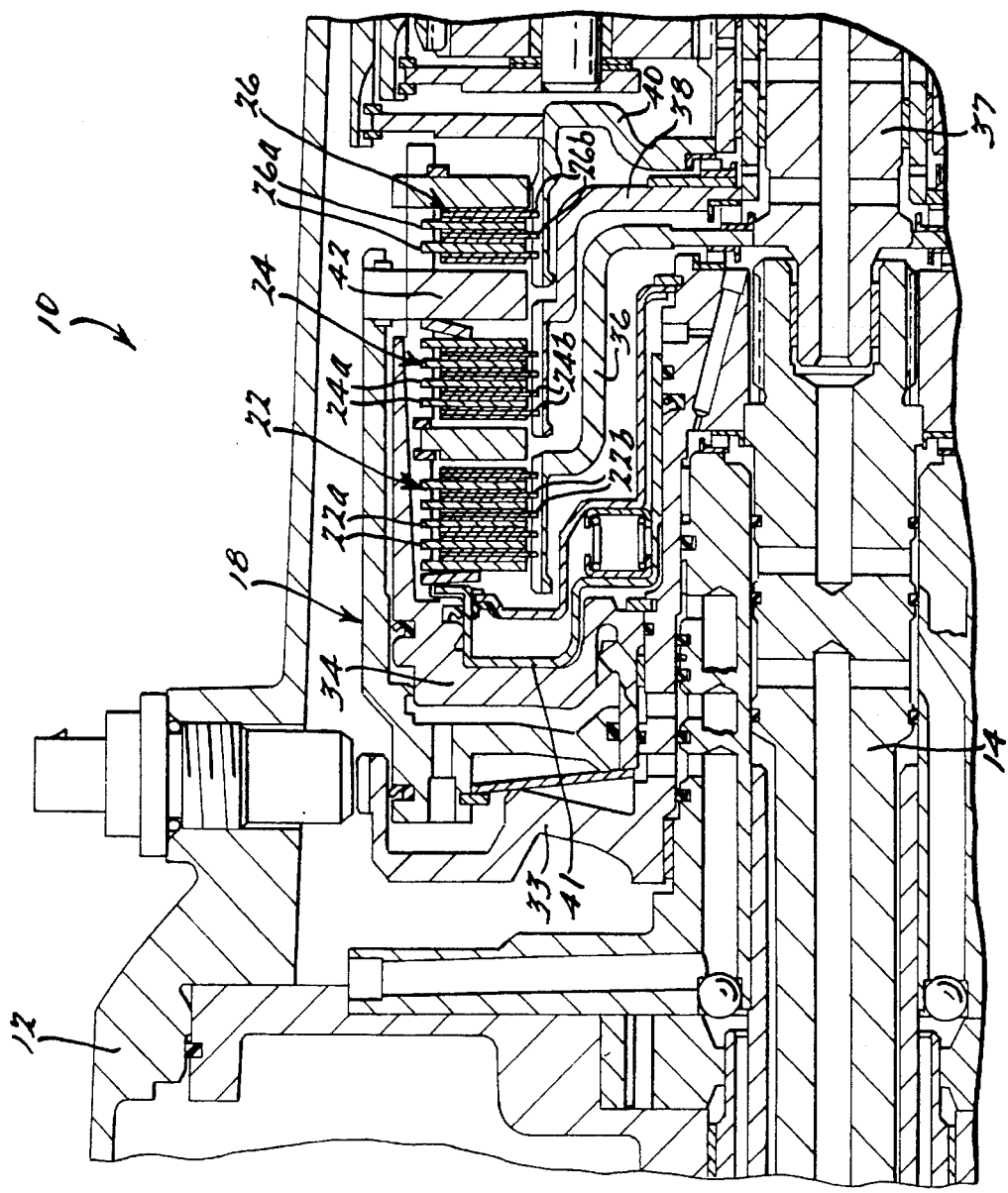
FIGS. 1A and 1B are a cross-sectional view of a five-speed automatic transmission according to the present invention.
Figure 1B:
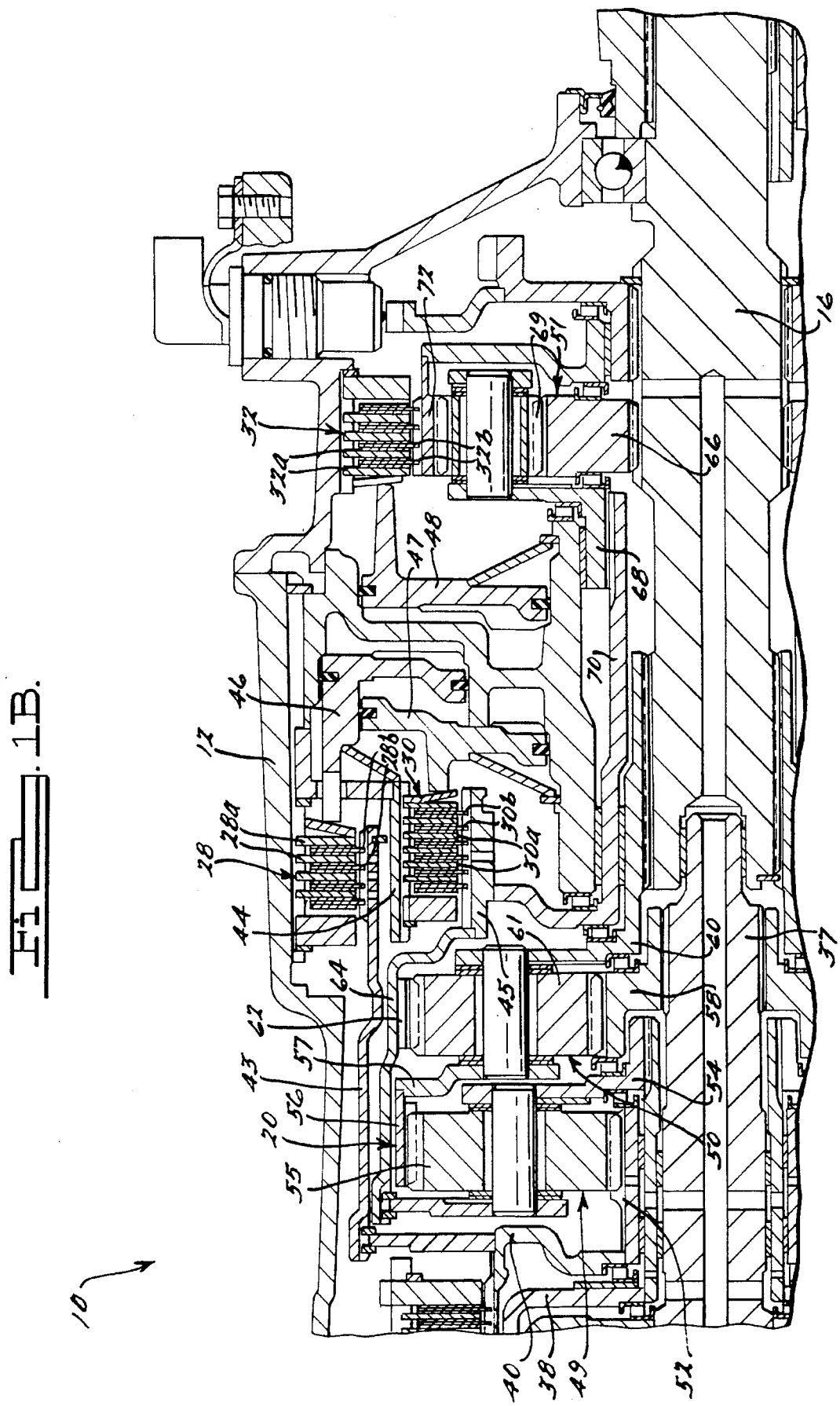

Referring to FIGS. 1A and 1B, a cross-sectional view of a five-speed automatic transmission, according to the present invention, is partially shown at 10. The five-speed automatic transmission 10 is adapted for use in a vehicle (not shown) such as an automotive vehicle. The five-speed automatic transmission 10 is similar to the four-speed automatic transmission disclosed in U.S. Pat. No. 4,875,391, the disclosure of which is hereby incorporated by reference, except to that specifically illustrated and described herein.

The five-speed automatic transmission 10 includes a transmission housing 12 for enclosing a torque converter assembly (not shown), an input member 14, an output member 16, a multi-clutch and brake assembly, generally indicated at 18, and a gear assembly generally indicated at 20. The transmission housing 12 is stationary relative to the rotatable input member 14, output member 16 and gear assembly 20. Power is transmitted from a rotating crankshaft (not shown) of an engine (not shown) to the torque converter assembly, in turn, to the rotatable input member 14.

The multi-clutch and brake assembly 18 allows predetermined gears within the gear assembly 20 to be selectively engaged and disengaged from either the input member 14 or the transmission housing 12. Near the input side of the transmission 10, the multi-clutch and brake assembly 18 includes an underdrive clutch assembly 22 (applied in first, second, third and fourth gears), an overdrive clutch assembly 24 (applied in fourth and fifth gears) and a reverse clutch assembly 26 (applied in reverse gear). Near the output side of the transmission 10, the multi-clutch and brake assembly 18 includes a three/five (35) brake assembly 28 (applied in third and fifth gears), a low/reverse brake assembly 30 (applied in first and reverse gears) and a second brake assembly 32 (applied in second gear). The multi-clutch and brake assembly 18 also includes an input retainer hub 33 splined to the input member 14 and an input retainer 34 splined to the input clutch retainer hub 33.

The underdrive clutch assembly 22 includes a plurality of axially spaced annular plates 22a and a plurality of axially spaced annular discs 22b which are alternated between the plates 22a and when the underdrive clutch assembly 22 is not applied, these plates 22a and discs 22b are free to move or rotate relative to each other. The plates 22a are mounted to the input retainer 34 and the discs 22b are mounted to an underdrive hub 36. The underdrive hub 36 is operatively connected to a rotatable gear shaft 37 of the gear assembly 20.

The overdrive clutch assembly 24 includes a plurality of axially spaced annular plates 24a and a plurality of axially spaced annular discs 24b. The plates 24a and discs 24b are similar to those of the underdrive clutch assembly 22. The plates 24a are mounted to the input retainer 34 and the discs 24b are mounted to an overdrive hub 38 operatively supported about the gear shaft 37 of the gear assembly 20.

The reverse clutch assembly 26 includes a plurality of axially spaced annular plates 26a and a plurality of axially spaced annular discs 26b. The plates 26a and discs 26b are similar to those of the underdrive clutch assembly 22. The plates 26a are mounted to the input retainer 34 and the discs 26b are mounted to a reverse hub 40 operatively connected to the gear assembly 20. It should be appreciated that the clutch assemblies 22, 24 and 26 are applied by fluid actuating devices 41 and 42 similar to that in U.S. Pat. No. 4,875,391.

The three/five brake assembly 28 includes a plurality of axially spaced annular plates 28a and a plurality of axially spaced annular discs 28b. The plates 28a and discs 28b are similar to those of the underdrive clutch assembly 22. The plates 28a are mounted to the transmission housing 12 and the discs 28b are mounted to a connecting member 43 connected to the reverse hub 40.

The low/reverse brake assembly 30 includes a plurality of axially spaced annular plates 30a and a plurality of axially spaced annular discs 30b. The plates 30a and discs 30b are similar to those of the underdrive clutch assembly 22. The plates 30a are mounted to a connecting member 44 connected to the transmission housing 12 and the discs 30b are mounted to a connecting member 45 of the gear assembly 20 to be described further herein.

The second brake assembly 32 includes a plurality of axially spaced annular plates 32a and a plurality of axially spaced annular discs 32b. The plates 32a and discs 32b are similar to those of the underdrive clutch assembly 22. The plates 32a are mounted to the transmission housing 12 and the discs 32b are mounted to an annulus gear 72 of the gear assembly 20 to be described further herein. It should be appreciated that the brake assemblies 28, 30 and 32 are applied by fluid actuating devices 46, 47 and 48, respectively.

The gear assembly 20 includes a front or first planetary gearset, generally indicated at 49, an axially spaced intermediate or second planetary gearset, generally indicated at 50, and an axially spaced rear or third planetary gearset, generally indicated at 51. The first planetary gearset 49 includes a first sun gear 52 at its center. The first sun gear 52 is connected to the reverse hub 40. The first planetary gearset 49 also includes a first planetary carrier 54 having a plurality of circumferentially spaced first pinion gears 55 to engage the first sun gear 52. The first planetary carrier 54 is spline connected to the overdrive hub 38. The first planetary gearset 49 further includes a first annulus gear 56 disposed about the first planetary carrier 54 and engages the first pinion gears 55. The ratio of the number of teeth on the sun gear to the number of teeth on the annulus gear in this example is 3.00. The first annulus gear 56 is connected to a connecting member 57 of the gear assembly 20.

The intermediate or second planetary gearset 50 includes a second sun gear 58 at its center which is spline connected to the gear shaft 37. The second planetary gearset 50 also includes a second planetary carrier 60 having a plurality of circumferentially spaced second pinion gears 61 to engage the second sun gear 58. The second planetary carrier 60 is connected to the connecting member 57 which is, in turn, connected to the first annulus gear 56. The second planetary carrier 60 is also spline connected to the output member 16. The second planetary gearset 50 further includes a second annulus gear 62 disposed about the second planetary carrier 60 and engages the second pinion gears 61. The ratio of the number of teeth on the sun gear to the number of teeth on the annulus gear in this example is 2.55. The second annulus gear 62 is connected to a connecting member 64 which is, in turn, connected to the first planetary carrier 54 and connecting member 45.

The rear or third planetary gearset 51 includes a third sun gear 66 at its center which is spline connected to the output member 16 of the transmission 10. The third planetary gearset 51 also includes a third planetary carrier 68 having a plurality of circumferentially spaced third pinion gears 69 to engage the third sun gear 66. The third planetary carrier 68 is spline connected to a connecting member 70 which is, in turn, connected to the connecting member 45. The third planetary gearset 51 further includes a third annulus gear 72 disposed about the third planetary carrier 68 and engages the third pinion gears 69. The ratio of the number of teeth on the sun gear to the number of teeth on the annulus gear in this example is 1.55.

Figures 2, 3:
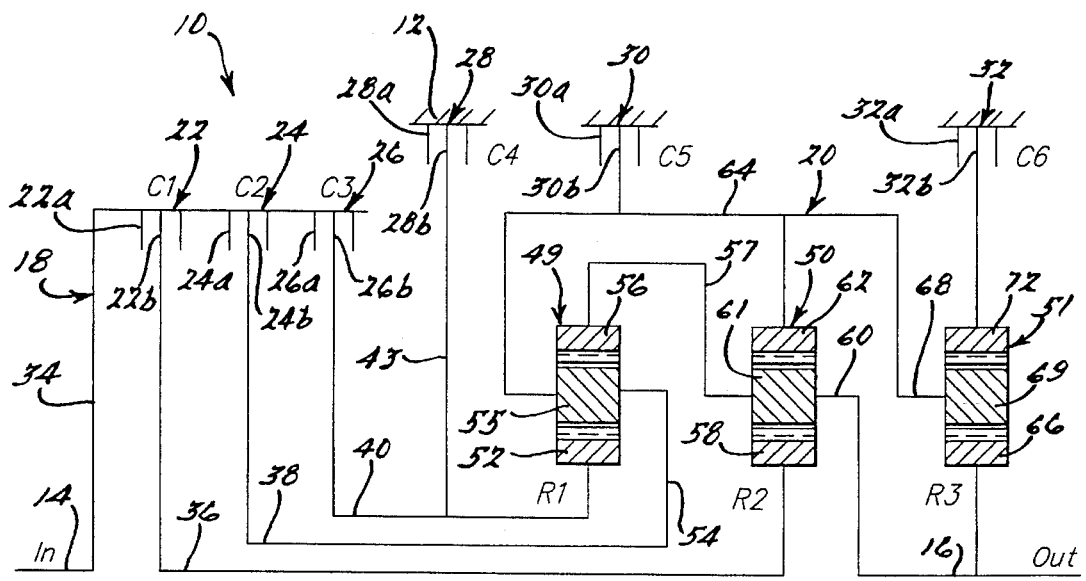
FIG. 2 is a cross-sectional schematic view of the five-speed automatic transmission of FIGS. 1A and 1B.
FIG. 3 is a chart of gears, gear ratio and clutches and brakes engaged for the five-speed automatic transmission of FIG. 2 when used as a five-speed overdrive.

Referring to FIG. 2, a cross-sectional schematic view of the transmission 10 is illustrated. In operation, the input member 14 of the transmission 10 rotates due to torque being transferred from the rotating crankshaft of the engine and through the torque converter assembly to the input member 14. The input retainer hub 33 and input retainer 34 also rotate with the input member 14 due to their connection. The plates 22a, 24a, 26a also rotate with the input retainer 34 due to the connection between them.

When the underdrive clutch assembly 22 is applied, the rotating plates 22a and discs 22b of the underdrive clutch assembly 22 engage each other and a frictional force is produced between the plates 22a and discs 22b. Because the input retainer 34 and plates 22a are rotating, the frictional force causes the discs 22b and underdrive hub 36 to rotate, in turn, rotating the gear shaft 37 and second sun gear 58 of the second planetary gearset 50.

When the overdrive clutch assembly 24 is applied, the rotating plates 24a and discs 24b of the overdrive clutch assembly 24 engage each other and a frictional force is produced between the plates 24a and discs 24b. Because the input retainer 34 and plates 24a are rotating, the frictional force causes the discs 24b and overdrive hub 38 to rotate, in turn, rotating the first planetary carrier 54, connecting member 64, second annulus gear 62, connecting member 70 and third planetary carrier 68.

When the reverse clutch assembly 26 is applied, the rotating plates 26a and discs 26b of the reverse clutch assembly 26 engage each other and a frictional force is produced between the plates 26a and discs 26b. Because the input retainer 34 and plates 26a are rotating, the frictional force causes the discs 26b and reverse hub 40 to rotate, in turn, rotating the first sun gear 52.

When the three/five brake assembly 28 is applied, the plates 28a and discs 28b of the three/five brake assembly 28 engage each other and a frictional force is produced between the plates 28a and discs 28b. Because the plates 28a do not rotate or are stationary, as they are connected to the transmission housing 12, the frictional force holds the discs 28b, connecting member 43 and reverse hub 40 stationary, in turn, holding the first sun gear 52 stationary.

When the low/reverse brake assembly 30 is applied, the plates 30a and discs 30b of the low/reverse brake assembly 30 engage each other and a frictional force is produced between the plates 30a and discs 30b. Because the plates 30a are stationary, as they are connected by the connecting member 44 to the transmission housing 12, the frictional force holds the discs 30b stationary, in turn, holding the connecting member 45, connecting member 70, connecting member 64, first planetary carrier 54, second annulus gear 62 and third planetary carrier 68 stationary.

When the second brake assembly 32 is applied, the plates 32a and discs 32b of the second brake assembly 32 engage each other and a frictional force is produced between the plates 32a and discs 32b. Because the plates 32a are stationary, as they are connected to the transmission housing 12, the frictional force holds the discs 32b stationary, in turn, holding the third annulus gear 72 stationary.

Referring to FIGS. 2 and 3, when the transmission 10 is desired to operate in first gear, the underdrive clutch assembly 22 and low/reverse brake assembly 30 are applied. This causes the second sun gear 58 to rotate and the second annulus gear 62 to be held stationary. As a result, rotation of the second sun gear 58 causes rotation of the second pinion gears 61 and the second planetary carrier 60. Because the output member 16 is connected to the second planetary carrier 60, rotation of the second planetary carrier 60 causes the output member 16 to rotate. This arrangement of the gear assembly 20 produces a gear ratio of 3.55.

When the transmission 10 is desired to operate in second gear, the underdrive clutch assembly 22 and the second brake assembly 32 are applied. This causes the second sun gear 58 to rotate and the third annulus gear 72 to be held stationary. By holding the third annulus gear 72 stationary, the third planetary carrier 68 and second annulus gear 62 rotate. As a result, the second planetary carrier 60, third sun gear 66 and output member 16 rotate at a greater r.p.m. than in first gear. This arrangement of the gear assembly 20 produces a gear ratio of 2.55.

When the transmission 10 is desired to operate in third gear, the underdrive clutch assembly 22 and the three/five brake assembly 28 are applied. This causes the second sun gear 58 to rotate and the first sun gear 52 to be held stationary. As a result, rotation of the second sun gear 58 causes the second planetary carrier 60 and first annulus gear 56 to rotate. By holding the first sun gear 52 stationary, the first pinion gears 55 and first planetary carrier 54 and second annulus gear 62 are made to rotate. As a result, the second planetary carrier 60, first annulus gear 56 and output member 16 rotate at a greater r.p.m. than in second gear. This arrangement of the gear assembly 20 produces a gear ratio of 1.64.

When the transmission 10 is desired to operate in fourth gear, the underdrive clutch assembly 22 and the overdrive clutch assembly 24 are applied. This causes the second sun gear 58 and second annulus gear 62 to rotate at the same speed. This causes the second planetary carrier 60 and output member 16 to also rotate at the same speed. This arrangement of the gear assembly 20 produces a gear ratio of 1.00.

When the transmission 10 is desired to operate in fifth gear, the overdrive clutch assembly 24 and the three/five brake assembly 28 are applied. This causes the first planetary carrier 54 to rotate and the first sun gear 52 to be held stationary. As a result, rotation of the first planetary carrier 54 causes the first annulus gear 56 and output member 16 to rotate at a higher r.p.m. than in fourth gear. This arrangement of the gear assembly 20 produces a gear ratio of 0.75.

When the transmission 10 is desired to operate in reverse gear, the reverse clutch assembly 26 and low/reverse brake assembly 30 are applied. This causes the first sun gear 52 to rotate and the first planetary carrier 54 to be held stationary. As a result, the first sun gear 52 rotates the first pinion gears 55 which, in turn, rotate the first annulus gear 54 backwards. Rotation of the first annulus gear 56 causes the second planetary carrier 60 to rotate which, in turn, causes rotation of the output member 16 in a direction opposite to the other gear positions. This arrangement of the gear assembly 20 produces a gear ratio of −3.00.

Accordingly, the five-speed automatic transmission 10 has a unique arrangement of the planetary gearsets 46, 48 and 50 to achieve a 0.75 overdrive ratio in fifth gear. The unique arrangement of the planetary gearsets 46, 48 and 50 results in ratio steps of small to medium magnitude.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A five-speed automatic transmission for a vehicle comprising:

a transmission housing;

an input member;

an output member;

a plurality of planetary gearsets for changing a ratio of torque between said input member and said output member, said planetary gearsets comprising solely a first planetary gearset, a second planetary gearset axially spaced from said first planetary gearset and a third planetary gearset axially spaced from said second planetary gearset; and a plurality of clutch assemblies to selectively couple said input member to predetermined gears of said planetary gearsets and a plurality of brake assemblies to selectively couple predetermined gears of said planetary gearsets to the transmission housing; and means for allowing said output member and a planetary carrier from one of said planetary gearsets and an annulus gear from another of said planetary gearsets and a sun gear from yet another of said planetary gearsets to rotate at the same velocity and direction.

2. A five-speed automatic transmission as set forth in claim 1 wherein each of said first, second and third planetary gearsets comprises a sun gear, an annulus gear and a planetary carrier having a plurality of circumferentially spaced pinion gears disposed between said sun gear and said annulus gear.

3. A five-speed automatic transmission for a vehicle comprising:

a transmission housing;

an input member;

an output member;

a plurality of planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to the transmission housing;

means for allowing said output member and a planetary carrier from one of said planetary gearsets and an annulus gear from another of said planetary gearsets and a sun gear from yet another of said planetary gearsets to rotate at the same velocity and direction;

said planetary gearsets comprising a first planetary gearset, a second planetary gearset axially spaced from said first planetary gearset and a third planetary gearset axially spaced from said second planetary gearset;

wherein each of said first, second and third planetary gearsets comprises a sun gear, an annulus gear and a planetary carrier having a plurality of circumferentially spaced pinion gears disposed between said sun gear and said annulus gear; and means for allowing said planetary carrier of said first planetary gearset and said annulus gear of said second planetary gearset and said planetary carrier of said third planetary gearset to rotate at the same velocity and direction or remain stationary.

4. A five-speed automatic transmission for a vehicle comprising:

a transmission housing;

an input member;

an output member;

a plurality of planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to the transmission housing;

means for allowing said output member and a planetary carrier from one of said planetary gearsets and an annulus gear from another of said planetary gearsets and a sun gear from yet another of said planetary gearsets to rotate at the same velocity and direction;

said planetary gearsets comprising a first planetary gearset, a second planetary gearset axially spaced from said first planetary gearset and a third planetary gearset axially spaced from said second planetary gearset;

wherein each of said first, second and third planetary gearsets comprises a sun gear, an annulus gear and a planetary carrier having a plurality of circumferentially spaced pinion gears disposed between said sun gear and said annulus gear; and wherein said clutch assemblies comprise a first clutch assembly to couple said input member to said sun gear of said second planetary gearset, a second clutch assembly to couple said input member to said planetary carrier of said first planetary gearset and said annulus gear of said second planetary gearset and said planetary carrier of said third planetary gearset, and a third clutch assembly to couple said input member to said sun gear of said first planetary gearset.

5. A five-speed automatic transmission for a vehicle comprising:

a transmission housing;

an input member;

an output member;

a plurality of planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to the transmission housing;

means for allowing said output member and a planetary carrier from one of said planetary gearsets and an annulus gear from another of said planetary gearsets and a sun gear from yet another of said planetary gearsets to rotate at the same velocity and direction;

wherein said planetary gearsets comprises a first planetary gearset, a second planetary gearset axially spaced from said first planetary gearset and a third planetary gearset axially spaced from said second planetary gearset;

wherein each of said first, second and third planetary gearsets comprises a sun gear, an annulus gear and a planetary carrier having a plurality of circumferentially spaced pinion gears disposed between said sun gear and said annulus gear; and wherein said brake assemblies comprise a first brake assembly to couple said transmission housing to said sun gear of said first planetary gearset, a second brake assembly to couple said transmission housing to said planetary carrier of said first planetary gearset and said annulus gear of said second planetary gearset and said planetary carrier of said third planetary gearset, and a third brake assembly to couple said transmission housing to said annulus gear of said third planetary gearset.

6. A gear assembly for a five-speed automatic transmission of a vehicle for changing a ratio of torque between an input member and an output member, said gear assembly comprising:

a first planetary gearset;

a second planetary gearset axially spaced from said first planetary gearset;

a third planetary gearset axially spaced from said second planetary gearset;

each of said first and second and third planetary gearsets comprising a sun gear, an annulus gear and a planetary carrier having a plurality of circumferentially spaced pinion gears disposed between said sun gear and said annulus gear;

means for allowing said annulus gear of said first planetary gearset and said planetary carrier of said second planetary gearset and said sun gear of said third planetary gearset to rotate at the same velocity and direction; and means for allowing said planetary carrier of said first planetary gearset and said annulus gear of said second planetary gearset and said planetary carrier of said third planetary gearset to remain stationary or to rotate at the same velocity and direction.

7. A gear assembly as set forth in claim 6 wherein said means comprises at least one connecting member interconnecting said annulus gear of said first planetary gearset and said planetary carrier of said second planetary gearset and said sun gear of said third planetary gearset.

8. A gear assembly as set forth in claim 6 wherein said means comprises at least one connecting member interconnecting said planetary carrier of said first planetary gearset and said annulus gear of said second planetary gearset and said planetary carrier of said third planetary gearset.

9. A five-speed automatic transmission for a vehicle comprising:

a transmission housing;

an input member;

an output member;

a plurality of planetary gearsets for changing a ratio of torque between said input member and said output member, said planetary gearsets comprising solely a first planetary gearset, a second planetary gearset axially spaced from said first planetary gearset, and a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said sun gear of said third planetary gearset to rotate at the same velocity and direction; and a third brake assembly to selectively couple said annulus gear of said third planetary gearset to said transmission housing to remain stationary.

10. A five-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said sun gear of said third planetary gearset to rotate at the same velocity and direction;

a third brake assembly to selectively couple said annulus gear of said third planetary gearset to said transmission housing to remain stationary; and means for allowing said planetary carrier of said first planetary gearset and said annulus gear of said second planetary gearset and said planetary carrier of said third planetary gearset to remain stationary or to rotate at the same velocity and direction.

11. A five-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said sun gear of said third planetary gearset to rotate at the same velocity and direction;

a third brake assembly to selectively couple said annulus gear of said third planetary gearset to said transmission housing to remain stationary; and a first brake assembly to selectively couple said sun gear of said first planetary gearset to said transmission housing to remain stationary.

12. A five-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said sun gear of said third planetary gearset to rotate at the same velocity and direction;

a third brake assembly to selectively couple said annulus gear of said third planetary gearset to said transmission housing to remain stationary; and a second brake assembly to selectively couple said planetary carrier of said first planetary gearset and said annulus gear of said second planetary gearset and said planetary carrier of said third planetary gearset to said transmission housing to remain stationary.

13. A five-speed automatic transmission as set forth in claim 9 including a first clutch assembly to selectively couple said input member to said sun gear of said second planetary gearset.

14. A five-speed automatic transmission as set forth in claim 9 including a second clutch assembly to selectively couple said input member to said planetary carrier of said first planetary gearset and said annulus gear of said second planetary gearset and said planetary carrier of said third planetary gearset.

15. A five-speed automatic transmission as set forth in claim 9 including a third clutch assembly to selectively couple said input member to said sun gear of said first planetary gearset.

16. A five-speed automatic transmission as set forth in claim 9 wherein said means comprises at least one connecting member interconnecting said annulus gear of said first planetary gearset and said planetary carrier of second planetary gearset and said sun gear of said third planetary gearset.

17. A five-speed automatic transmission as set forth in claim 10 wherein said means comprises at least one connecting member interconnecting said planetary carrier of said first planetary gearset and said annulus gear of said second planetary gearset and said planetary carrier of said third planetary gearset.

18. A five-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said sun gear of said third planetary gearset to rotate at the same velocity and direction;

means for allowing said planetary carrier of said first planetary gearset and said annulus gear of said second planetary gearset and said planetary carrier of said third planetary gearset to remain stationary or to rotate at the same velocity and direction;

a first brake assembly to selectively couple said sun gear of said first planetary gearset to said transmission housing to remain stationary;

a second brake assembly to selectively couple said planetary carrier of said first planetary gearset and said annulus gear of said second planetary gearset and said planetary carrier of said third planetary gearset to said transmission housing to remain stationary;

a third brake assembly to selectively couple said annulus gear of said third planetary gearset to said transmission housing to remain stationary;

a first clutch assembly to selectively couple said input member to said sun gear of said second planetary gearset;

a second clutch assembly to selectively couple said input member to said planetary carrier of said first planetary gearset and said annulus gear of said second planetary gearset and said planetary carrier of said third planetary gearset; and a third clutch assembly to selectively couple said input member to said sun gear of said first planetary gearset to rotate at the same velocity and direction.

\* \* \* \* \*